July 31, 1928.  J. B. ALLEN ET AL  1,679,068

ELECTRIC CAR

Filed Jan. 15, 1927

James B. Allen
Ernest O. Hamilton
INVENTOR.

BY
Edwin F. Corley
ATTORNEYS.

Patented July 31, 1928.

1,679,068

UNITED STATES PATENT OFFICE.

JAMES B. ALLEN, OF SHIDLER, OKLAHOMA, AND ERNEST O. HAMILTON, OF COLUMBUS, OHIO.

ELECTRIC CAR.

Application filed January 15, 1927. Serial No. 161,450.

Our invention relates to electric cars and especially to that class adapted to convey some object such as a lure, or bait in dog racing or the like at a high rate of speed along or about a small track.

Cars used previous to this time have been large and consequently expensive both to build and operate.

One object of our invention is to provide a small compact car operable on a single track said car preferably being adapted to travel along the outside circumference of an oval track thus keeping the rabbit or lure in constant sight of the dogs or animals running on said oval track.

Another object of our invention is to provide a suitable overhead tubular member to conduct the necessary electric current from its original source to the car, said overhead member also providing means for holding the car in upright position.

Other objects of our invention will be explained in the following description and all features are illustrated in the accompanying drawings wherein similar reference numerals designate corresponding parts in the several figures and wherein.

Figure 1:
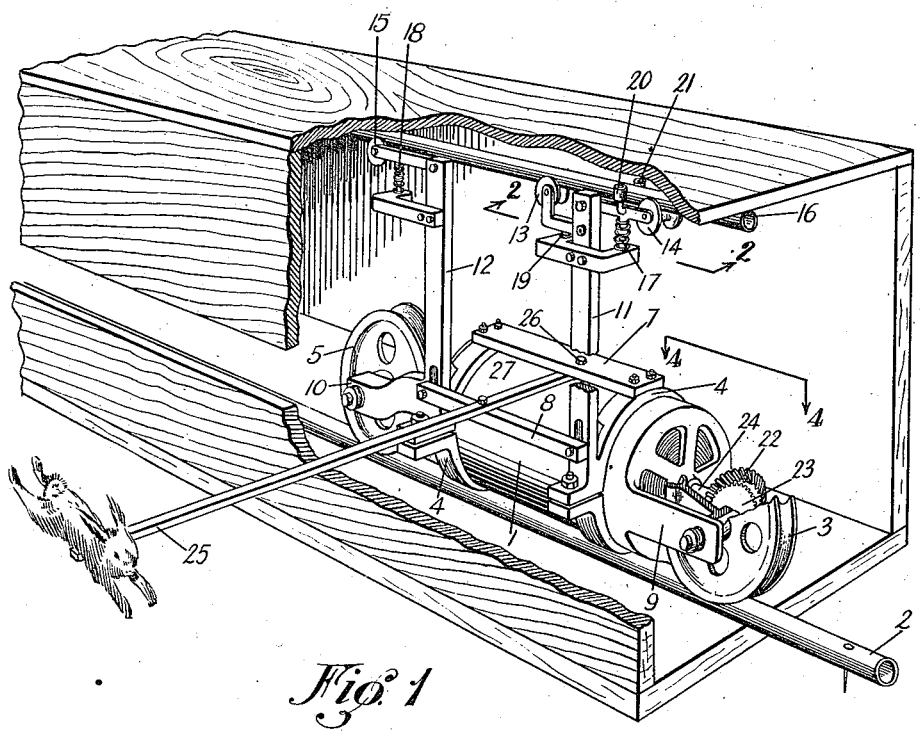
Figure 1 is a perspective view of our invention showing the various features in assembled position.

In Figure 1 of the drawings we have shown an electric motor 1 supported in a suitable frame, said frame preferably comprising saddle brackets 4 spaced from each other by the braces 7 and 8 and having as an integral part the arms 9 and 10 to provide means for attaching the wheels 3 and 5.

The saddle brackets 4 also have as an integral part the vertical posts 11 and 12 adapted to carry the small concave wheels 14 and 15. These small concave wheels are insulated in any desired manner and are held against the overhead tubular member 16 by means of the compressed springs 17 and 18.

The vertical post 11 also carries the concave trolley wheel 13, this trolley wheel 13 being held against the overhead tubular member 16 by means of the compressed spring 19.

Figure 2:
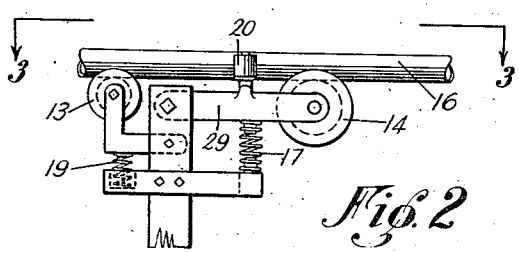
Figure 2 is a side elevational view taken on line 2—2 of Figure 1 showing the means for transmitting the current from the overhead tubular member to the motor and means for holding the car in upright position.
Figure 3:
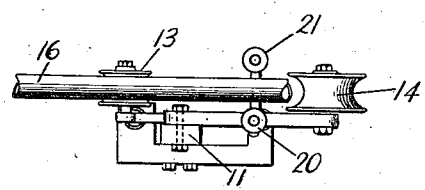
Figure 3 is a top plan view of the parts shown in Figure 2 and taken on line 3—3 of Figure 2.
Figure 4:
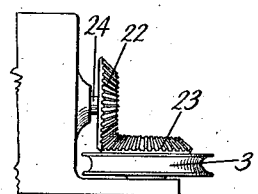
Figure 4 is a top plan view of the driving gear taken on line 4—4 of Figure 1.

Attached to the arm 29 (see Figure 2) and travelling on opposite sides of the overhead tubular member 16 are insulated wheels 20 and 21. These wheels prevent the car leaving the track when rounding a curve.

The driving mechanism comprises the bevel gear 22 rigidly attached to the shaft 24 of the motor 1 and the bevel gear 23 rigidly attached to the concave wheels 3, the gears being placed so as to intermesh. As the motor 1 rotates the shaft 24 and the gear 22, the motion is transmitted to the concave wheel 3 by means of the gear 23 and the car is caused to move along the tubular track 2.

A rigid arm 25 for carrying a lure or bait is attached to the braces 7 and 8 by the bolts 26 and 27. This arms is made of a length suitable for placing the lure or bait directly over the racing track.

The electric current for charging the overhead tubular member may be controlled at any desired point along the track and by any means suiting the preference of the user. This current is transmitted through the trolley wheel 13 to wires (not shown) and thence to the motor 1.

The secure fastening of the tubular rail 2 may be accomplished by means of screws, bolts or by any other well known means and the overhead tubular member may be rigidly held in place by insulated brackets or other means well known to the art.

We have shown our invention as employing concave wheels, a tubular rail and a tubular overhead member but our invention is not limited to the type of rail, overhead member and wheel hereinbefore described.

It will be seen that we have shown by our invention improvements in electric cars wherein the reduced size, and consequent lessening of cost of production and operation, is the essential feature.

Having thus described our invention, what we claim is:

In animal racing apparatus, a lure conveyer constructed to travel on a single rail comprising a suitable frame and carrier wheels, a motor mounted on said frame and operatively connected to the carrier wheels by gearing, a rail for carrying the lure conveyer, a rigid electrically-energized overhead member, a spring-pressed means mounted on said conveyer that cooperate with said rigid overhead member to hold said lure conveyer on said track and provide a means for transmitting electric current from said overhead member to said motor, an outwardly extending arm carried by said conveyer and a lure mounted thereon.

In testimony whereof we hereby affix our signatures.

J. B. ALLEN.
ERNEST O. HAMILTON.